April 11, 1939.  I. F. KINNARD  2,154,310
METER CONNECTION BOX
Filed Jan. 17, 1936   2 Sheets-Sheet 1
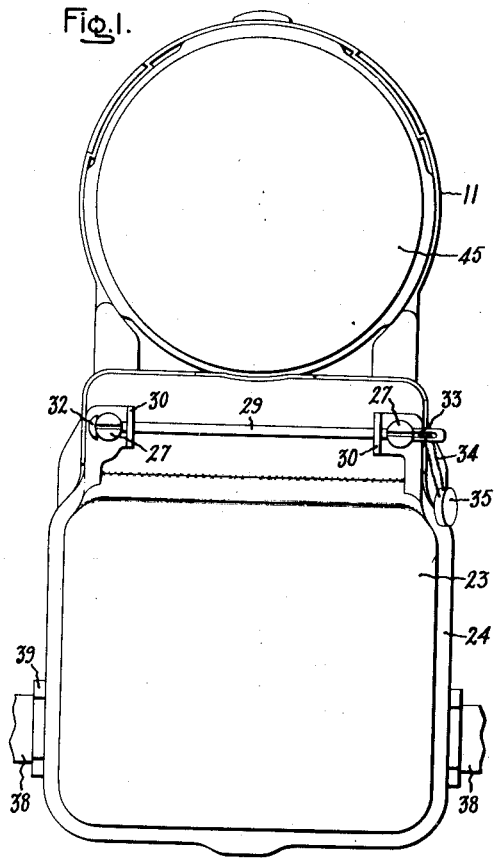
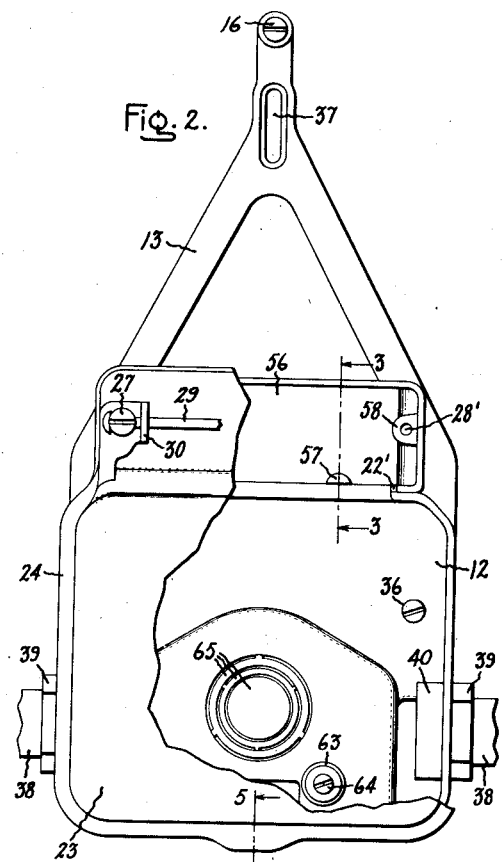
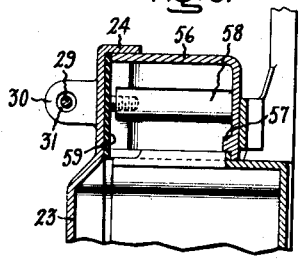
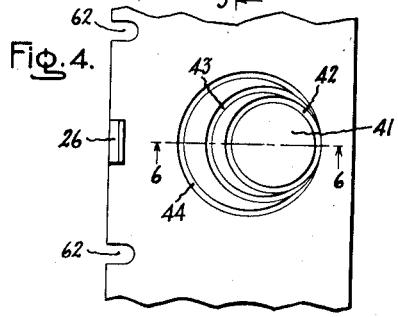
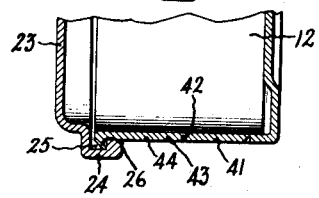
Inventor:
Isaac F. Kinnard,
by Harry E. Dunham
His Attorney.

April 11, 1939.  I. F. KINNARD  2,154,310
METER CONNECTION BOX
Filed Jan. 17, 1936  2 Sheets-Sheet 2
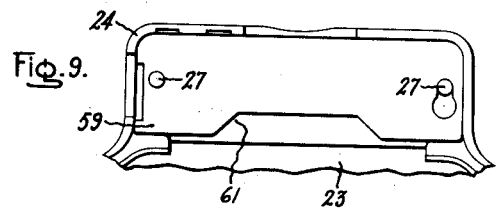
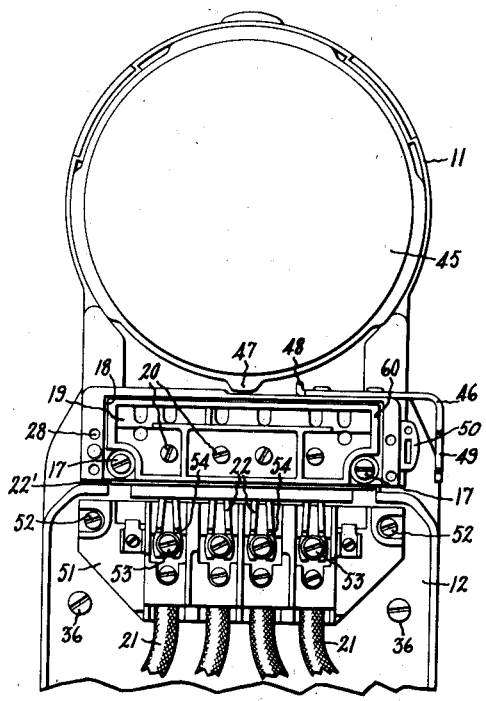
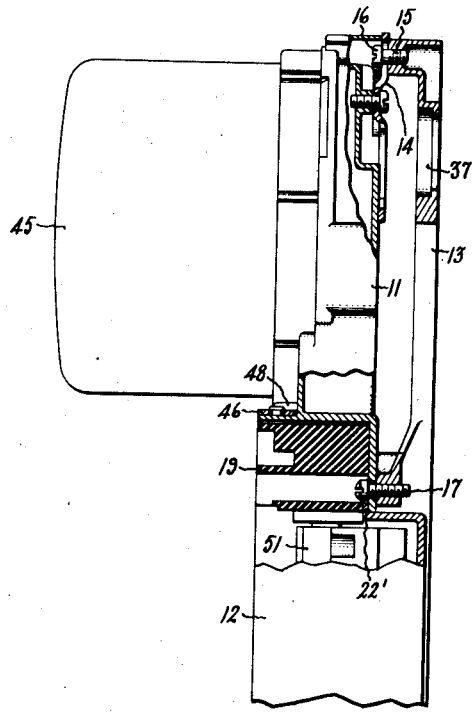
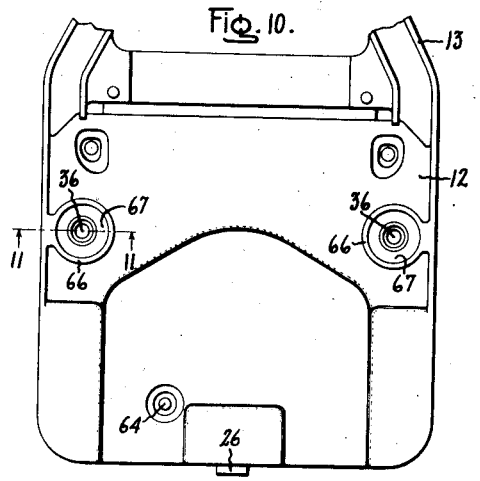
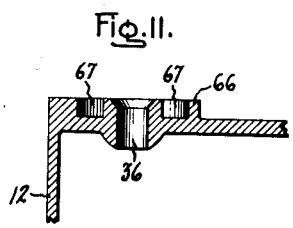
Inventor:
Isaac F. Kinnard.
by Harry E. Dunham
His Attorney.

Patented Apr. 11, 1939

2,154,310

UNITED STATES PATENT OFFICE 2,154,310

METER CONNECTION BOX

Isaac F. Kinnard, Lynnfield, Mass., assignor to General Electric Company, a corporation of New York Application January 17, 1936, Serial No. 59,598

2 Claims. (Cl. 175—225)

My invention relates to protective casings and connection boxes for electrical devices, and concerns particularly connection boxes for mounting meters in exposed locations.

It is an object of my invention to provide a connection box adapted to be used with an electrical meter of the type which is interchangeable in indoor and outdoor service.

It is an object to provide an arrangement in which the connection box and the meter, themselves, and the joint between them are weathertight and tamperproof.

Still another object of the invention is to provide an arrangement in which a single seal may be used for sealing the meter and connection box together and for sealing the connection box, itself, the terminal chamber of the meter, and the meter mechanism.

A further object of the invention is to provide an arrangement for closing a meter connection box in a weathertight and tamperproof manner when the meter has been removed.

An additional object of the invention is to provide a compact unitary connection box and meter-supporting frame.

Other and further objects and advantages will become apparent as the description proceeds.

The invention will be understood more readily from the following detailed description when considered in connection with the accompanying drawings, and those features of the invention which are believed to be novel and patentable will be pointed out in the claims appended hereto. In the drawings, Fig. 1 is a front view of a meter and connection box embodying my invention; Fig. 2 is a front view with a portion of the cover broken away of the apparatus of Fig. 1 with the meter replaced by an attachment for closing the meter opening in the connection box; Fig. 3 is a fragmentary sectional view of a portion of the apparatus of Fig. 2 cut by the plane 3—3; Fig. 4 is a fragmentary lower end view of the apparatus of Figs. 1 and 3 with the cover removed; Fig. 5 is a fragmentary sectional view of the lower end of the apparatus cut by the plane 5—5 indicated in Fig. 2; Fig. 6 is an enlarged detail sectional view of a portion of the bottom wall seen in Fig. 5; Fig. 7 is a fragmentary view of a portion of the apparatus of Fig. 1 with the connection box cover removed to show a meter connection block and a locking mechanism for the meter mechanism; Fig. 8 is a fragmentary sectional view of a portion of the apparatus of Fig. 1, Fig. 9 is a fragmentary rear view of a portion of the connection box cover showing the upper portion thereof; Fig. 10 is a rear view of the connection box; and Fig. 11 is a fragmentary sectional view of a portion of the connection box cut by the plane 11—11 indicated in Fig. 10. Like reference characters are used in the drawings to designate like parts throughout.

The apparatus illustrated in the drawings comprises an integrating meter 11 of a type adapted for wall mounting and a connect box 12 to which is attached a frame 13 for supporting the meter. Preferably, the box 12 and the frame 13 are die cast in one piece from a suitable material, such as aluminum alloy. The meter 11 may either have an external hanging lug or a blind buttonhole slot 14 on its back wall, as described more in detail in the copending application of George R. Sturtevant Serial No. 744,478, filed September 18, 1934, now Patent No. 2,053,119 and assigned to the same assignee as the present invention. The upper end of the frame 13 carries, fixed therein, a screw 15 with a head 16 cooperating with the slot 14 to support the meter removably. If desired, removable screws 17 may also be provided at the bottom of the meter 11 to fasten it more securely to the frame 13.

The meter 11 is of the type having a terminal chamber 18 at the lower end thereof for receiving a terminal block 19, and the terminal chamber is open in front for the purpose of permitting manipulation of terminal screws 20 and is open at the bottom for directly receiving electrical conductors 21 or for receiving connecting links 22. The connection box 12 is open at the top and front, and the top opening registers with the bottom opening of the meter. If desired, the terminal block 19 may be grooved and the edge of the top connection box opening may be bent at right angles forming a tongue 22' to guard against the entrance of moisture or of an implement which might be used by an unauthorized person with the desire of tampering with the meter or its connections. As the front openings of the meter terminal chamber and the connection box face the same way and form continuations of one another, a single common cover 23 may be employed for closing the terminal chamber 18 and the connection box 12.

The cover 23 is provided all around with an overhanging flange 24 which guards against moisture and tampering as well as making the assembly more secure. At the bottom, the flange 24 is either slotted or doubled over to form a slot 25 cooperating with a hook 26 on the lower edge of the box 12 which necessitates pivoting or hinging the cover 23 around the hook 26 in order to remove it on account of the portion of overhanging flange 24 at the upper end of the cover 23. Fastening screws 27 cooperating with suitable openings in the cover 23 and threaded holes 28 in the meter 11 are provided for securing the upper end of the cover 23, the lower end being secured by the hook 26 and the slot 25. To permit sealing the cover 23 in place, the heads of the screws 27 have transverse holes therein to receive a sealing bar 29. If desired, ears 30 may be formed on the cover 23, preferably cast integrally therewith, and the ears 30 are also provided with openings 31 cooperating with the sealing bar 29. The sealing bar 29 has a head 32 at one end and a slot 33 at the other end receiving a padlock or a sealing wire 34 with a seal 35, thus preventing the removal of the sealing bar and the opening of the terminal chamber of the connection box without breaking the seal.

In order that the connection box may be fastened to a wall or panel, screw holes 36 are provided in the back of the box and a screw hole 37 is provided in the frame 13. The screw hole 37 is elongated in order that it will not be necessary to adhere to a fixed vertical distance between the screws in holes 36 and 37, thus permitting the location of the screws to be accommodated to the character of the wall or mounting surface. For example, in the case of brick walls, it may be desirable to fasten the screws to plugs driven in between the bricks.

It will be understood that the line conductors 21 will be brought into the connection box through suitable openings which may be at the side, bottom, or back. Preferably, the conductors 21 are brought in through conduit 38, which is attached to the walls of the box 12 in any suitable well known manner as by means of nuts 39 on the outside and other nuts 40 on the inside on threaded end portions of the conduits 38. To permit attaching conduit to any desired wall without having unused conduit-receiving openings in the connection box, knockouts or breakouts 41 are provided in the side, bottom, and back walls. The breakouts 41 are formed by cutting or casting circular grooves 42 in the walls of the box 12 so that a blow from a hammer or other suitable implement will serve to break out the disc 41 and form a conduit-receiving opening where desired. Several different sizes of breakouts may be provided to accommodate different sizes of conduit and preferably the breakouts are eccentric in order that the same wall clearance will be provided for any size conduit. For two other conduit sizes, circular grooves 43 and 44 are provided which are tangent to the groove 42 at a point nearest the back of the box 12. It will be observed that the grooves 42, 43, and 44 are successively less deep in order to prevent breaking out more of the wall of the box 12 than desired. Since the material under the groove 42 is weaker than that under the other grooves, a blow struck within the area bounded by the groove 42 will break out the disc 41 and leave the rest of the box intact. Likewise, a blow struck within the area between the grooves 42 and 43 will break out a larger disc and leave the surrounding portion of the wall intact.

If desired, the meter 11 may be of the type disclosed in United States Patent No. 1,979,928 to Hans A. Bakke in which there is a separate glass cover 45 for a chamber containing the meter movement or electrical mechanism and a sliding bar 46 serving as a cover lock for the meter mechanism. The cover 45 is attachable to the base of the meter 11 by a bayonet lock of the well known type, being arranged in the apparatus to be removable by counterclockwise twisting and to be in locked position when its projection 47 is down in the position shown in Fig. 7. The sliding locking bar 46 has a nose 48 adapted to engage the cover projection 47 and a slotted transverse arm 49 adapted to slip over a lug 50. The bar 46 is shown slid to the right in unlocked position but it will be understood that, when the locking bar 46 is slid to the left, its nose 48 engages the projection 47 to prevent the cover 45 from being untwisted and removed, and that the transverse arm 49 lies against the edge of the terminal chamber 18 with the lug 50 protruding through the arm 49 to permit threading a separate sealing wire through the lug 50, if desired. In the apparatus illustrated in the present application, however, although such a separate sealing wire may be used it is unnecessary as the portion of the flange 24 of the cover 23 which lies to the right of the terminal chamber overlaps the arm 49 when it is in its locking position so that the attachment and sealing of the cover 23 locks the locking bar 46 and the meter mechanism cover 45.

Even if the meter-securing screws 17 are omitted, the cover 23 locks the meter in position on the box 12 and the frame 13, owing to the fact that the buttonhole slot 14 cannot be freed from the screw head 16 without sliding the meter 11 upward and the portion of the flange 24 at the top of the cover 23 overlaps the upper edge of the terminal chamber 18 and prevents the meter 11 from sliding. Obviously, the lower end of the meter 11 is also prevented from sliding sidewise. Since the heads of the screws 36 are within the box 12, it cannot be removed from the wall supporting it while the cover 23 is sealed in place. Manifestly, sealing the cover 23 in place also seals the terminal chamber 18, the line wires 21, and the connections.

Although the line wires 21 may be connected directly to the terminals of the meter 11 in the terminal block 19, I have found it desirable to take advantage of the fact that the construction of the box permits the use of meter test facilities or connecting and disconnecting features, such as disclosed in United States Patent No. 2,010,710, Bakke, or the copending application of Hans A. Bakke and Harold F. Crotty, Serial No. 59,580, filed concurrently herewith, Patent No. 2,092,631 granted September 7, 1937, and assigned to the same assignee as the present application. As explained more in detail in the aforesaid copending application, the meter 11 may be provided with a connection block having two parts, the terminal block 19 and a test block 51. The two parts of the connection block may be separate and, in that case, the terminal block 19 is fastened in the terminal chamber 18, and the test block 51 is fastened in place in the box 12 by means of screws 52. The wires 21 are connected in the test block 51 and this arrangement permits the meter 11 to be removed and replaced without any necessity for the permanent wiring 21 to be handled.

The sliding links 22 are slidably receivable in hollow terminals in the terminal block 19 and may be slid upward out of engagement with the clamping screws 53 of the test block 51. The links 53 have transverse notches 54 which permit sliding the links 53 into either position with the point of an insulated-handle screw driver so that meter disconnecting, connecting, and replacement operations may be performed with the utmost safety to the operator.

For cases when the meter 11 is to be removed without being replaced, an auxiliary cover 56 (Figs. 2 and 3) is provided to keep the box 12 closed and to permit sealing the interior. The auxiliary cover 56 is open at the front and bottom to correspond to the terminal chamber 18 of the meter 11. The lower edge of the auxiliary cover 56 is shaped to fit around the upturned ridge 22' at the upper edges of the connection box 12 and, if desired, positioning lugs 57 may be formed in the auxiliary cover 56.

For the purpose of holding the cover 23 in place and permitting it to be sealed, the auxiliary cover has ribs 58 which permit the provision of tapped holes 28' corresponding to the tapped holes 28 in the meter 11 and cooperating with screws 27. As an additional precaution against the leakage of moisture into the interior, a gasket 59 of cork or other resilient material may be provided, lining the upper portion of the cover 23 and adapted to press against the front edges of the auxiliary cover 56 or the ridges 60 of the terminal block 19.

As shown in Fig. 9, the gasket 59 is cut out at 61 to form a reentrant lower edge so as to provide an outlet from the lower portion of the terminal compartment permitting free drainage of any condensate which may be formed in the terminal compartment. Any such condensate tends to cling to the cover 23, flowing down to the lower portion of the box 12 at which drain holes 62 are provided, permitting any moisture within the box to drain off.

As shown in Fig. 2, a grounding lug 63 with a clamping screw 64 may be provided in one of the lower corners of the box 12 to permit convenient connection of a grounding circuit. Concentric knockouts 65 at the back of the box 12 adapted to various sizes of conduit may be utilized when it is desired to attach to the box conduit for a grounding circuit.

In order to guard against leakage of moisture into the box 12 through the mounting screw holes 36 in the back of the box, the guard rings 66 and annular grooves 67 may be provided around the mounting holes 36 as shown in Figs. 10 and 11.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States, is:

1. In combination, an electric integrating meter with a terminal block in a terminal chamber at one end of said meter, and a connection box with an opening at one end thereof smaller than said end of said box, said box having walls bent at the edges of said opening to form a projecting tongue, said terminal block being grooved to receive said tongue.

2. In combination, an electrical device, a connection box therefor, a supporting frame for said device attached to said connection box, and a cover, said device having at one end thereof a terminal chamber open on two sides perpendicular to each other and containing a terminal block with a groove in one outside face thereof, said box also being open on two sides perpendicular to each other, said device being mounted on said frame and against said box with an open side of one against and closing an open side of the other and the two remaining open sides facing the same way, the opening in the end of said box toward said device being smaller than said end and said box having walls bent at the edges of said latter opening to form a projecting tongue fitting in the groove in said terminal block, said cover being adapted to fit over and close said remaining open sides.

ISAAC F. KINNARD.